Patented Feb. 9, 1937

2,070,117

UNITED STATES PATENT OFFICE 2,070,117

DIHYDROTACHYSTEROL AND PROCESS OF MANUFACTURING THE SAME

Otto Dalmer and Fritz von Werder, Darmstadt, Germany, assignors to Winthrop Chemical Company, Inc., New York, N. Y., a corporation of New York No Drawing. Application July 25, 1935, Serial No. 33,191. In Germany July 27, 1934

8 Claims. (Cl. 260—153)

This invention relates to dihydrotachysterol and to a process of manufacturing the same.

Windaus, V. Werder and Luettringhaus (Annalen der Chemie, vol. 499 (1932), page 198) have subjected tachysterol to reduction by means of sodium and propylalcohol. An non-uniform mixture of substances was obtained which was not characterized in detail.

In accordance with the present invention a well defined product possessing constant properties is obtainable by treating tachysterol-3,5-dinitro-4-methyl-1-benzoate (compare Annalen der Chemie 499 (1932) page 193) in a lower aliphatic alcohol with sodium, preferably while heating to boiling. Ethyl and propyl alcohol are preferred as the lower aliphatic alcohols, but also others, such as methyl and isopropyl alcohol may be used. The reaction product is isolated by extracting the hydrogenated tachysterol formed from the reaction mixture, for instance, after diluting the alcoholic reaction mixture with water and extraction with an organic solvent, for instance, ether. It is advantageous to repeat the reduction with sodium in alcohol until the properties of the reaction product obtained do not change any more. According to analysis and the number of double bonds which may be established in the usual manner the new product is dihydrotachysterol of the formula: $C_{28}H_{46}O$. It may be characterized by its rotation power $$[\alpha]_D^{20} = +20°$$

(in alcohol). The ultraviolet absorption spectrum besides a maximum at $250\mu$ shows further maxima at 242 and $261\mu$. The following observations could be established on biologically testing the substance: By very small doses the blood calcium level is considerably increased. The tachysterol has an analogous effect; however, the effect is ten times stronger with the product of the present invention. If administered in larger doses the typical poisonous effect is attained with the mouse as is attained when taking an excess dose of vitamin D. The smallest dose capable of killing a mouse amounts to 0.03 to 0.05 mgs.

Contrary to tachysterol, the product obtained in accordance with the present invention, besides the above mentioned higher efficacy, is distinguished by its great stability. It is not at all attacked by atmospheric oxygen. Also its solutions in oil are stable. A solution treated with steam for 4 hours showed an undiminished efficacy when biologically tested with the mouse. In contradistinction thereto (Windaus and co-workers, loc. cit. page 195, paragraph 3) the tachysterol is very sensitive to air.

Windaus and his co-workers, who likewise prepared tachysteral - 3,5 - dinitro-4-methyl-1-benzoate, did not subject the latter to a reduction process, but first converted the said product into tachysterol by saponification and subjected the tachysterol to the action of a reducing agent. The process of the present invention avoids the manufacture of the free relatively unstable tachysterol completely and combines the treatment with sodium in the presence of a lower aliphatic alcohol, the saponification of the tachysterol ester and the reduction in one working stage. The result of the simultaneous saponification and reduction of the tachysterol-3,5-dinitro-4-methylbenzoate is particularly surprising in so far as it was to be suspected that the very reactive nitro components formed by saponification would have a disturbing effect on the reaction. It is furthermore surprising that from the reaction mixture diluted with water immediately the uniform dihydrotachysterol without impurities caused by the dinitro-components or decomposition products thereof is obtainable by extraction with organic solvents, such as ether.

The invention is further illustrated by the following example:

*Example.*—5 grams of finely powdered tachysterol-3,5-dinitro-4-methyl-1-benzoate are introduced into a boiling solution of 5 grams of sodium in 100 ccs. of absolute ethyl alcohol. With repeated shaking further 20 grams of sodium metal are added within 4 hours at boiling temperature. The separation of sodium ethylate is prevented by adding small quantities of absolute ethyl alcohol. Finally the metal residues are destroyed in the usual manner.

After the addition of a large quantity of water the solution is completely extracted with ether. The combined ether solutions are washed with water, dried over sodium sulfate, shaken with a slight quantity of charcoal and filtered. The water-clear ether solution after evaporation leaves a residue of 3 grams which is again subjected to reduction in the manner specified above. According to the said method 2.8 grams of dihydrotachysterol of the above indicated properties are obtained.

On using n-propyl alcohol the process proceeds in an analogous manner. The same well definable end-product is obtained when working in the following manner:

10 grams of sodium are dissolved in 200 ccs. of normal propyl alcohol (distilled over metallic calcium) while heating. The solution is heated to boiling and gradually treated with 10 grams of finely powdered tachysterol-3,5-dinitro-4-methyl-1-benzoate. Within 4 hours 40 grams of sodium and small quantities of absolute propyl alcohol are introduced into the boiling solution in such a manner that the reaction is kept in vivid progress and no sodium propylate separates. After the metal residues have been destroyed and after the addition of the four-fold volume of water the solution is several times extracted with ether. The combined ethereal solutions are washed with water, dried over sodium sulfate, filtered with suction, concentrated and finally evaporated to dryness in vacuo. The residue is dissolved in 50 ccs. of absolute propyl alcohol. The solution is again reduced in the manner specified and worked up. The yield amounts to 5.9 grams.

We claim:—

1. Dihydrotachysterol of the formula $C_{28}H_{46}O$, having in alcoholic solution a rotation power $$[\alpha]_D^{20} = +20°$$

and an absorption spectrum having maxima at 242, 250 and 261$\mu$, having an increasing efficacy on the blood calcium level.

2. In the process of manufacturing dihydrotachysterol, the step which comprises subjecting tachysterol-3,5-dinitro-4-methyl-1-benzoate to the treatment with sodium in the presence of an absolute lower aliphatic alcohol.

3. In the process of manufacturing dihydrotachysterol, the step which comprises subjecting tachysterol-3,5-dinitro-4-methyl-1-benzoate to the treatment with sodium in the presence of an absolute lower aliphatic alcohol while heating.

4. In the process of manufacturing dihydrotachysterol, the step which comprises subjecting tachysterol-3,5-dinitro-4-methyl-1-benzoate to the treatment with sodium in the presence of absolute ethyl alcohol while heating.

5. In the process of manufacturing dihydrotachysterol, the step which comprises subjecting tachysterol-3,5-dinitro-4-methyl-1-benzoate to the treatment with sodium in the presence of absolute propyl alcohol while heating.

6. The process which comprises subjecting dihydrotachysterol-3,5-dinitro-4-methyl-1-benzoate to the treatment with sodium in the presence of an absolute lower aliphatic alcohol while heating to boiling, diluting the reaction mixture with water, extracting with ether, evaporating the ether and repeating the aforementioned steps with the residue of the ethereal solution.

7. The process which comprises subjecting dihydrotachysterol-3,5-dinitro-4-methyl-1-benzoate to the treatment with sodium in the presence of absolute ethyl alcohol while heating to boiling, diluting the reaction mixture with water, extracting with ether, evaporating the ether and repeating the aforementioned steps with the residue of the ethereal solution.

8. The process which comprises subjecting dihydrotachysterol-3,5-dinitro-4-methyl-1-benzoate to the treatment with sodium in the presence of absolute propyl alcohol while heating to boiling, diluting the reaction mixture with water, extracting with ether, evaporating the ether and repeating the aforementioned steps with the residue of the ethereal solution.

OTTO DALMER.
FRITZ von WERDER.